Patented July 14, 1953

2,645,619

UNITED STATES PATENT OFFICE 2,645,619

MANUFACTURE OF SILICA

James Hoekstra, Evergreen Park, Ill., assignor to Universal Oil Products Company, Chicago, Ill., a corporation of Delaware No Drawing. Application December 14, 1951, Serial No. 261,750

15 Claims. (Cl. 252—448)

This invention relates to the manufacture of silica and more particularly to specific improvements in the forming of silica hydrosol and the conversion thereof into silica gel and more particularly into silica gel of substantially spherical shape. In still another embodiment the present invention contemplates the preparation of silica base catalysts.

The preparation of silica gel from silica hydrosol has been studied extensively because considerable difficulty has been encountered in the manufacture of the gel. This difficulty is further emphasized when substantially spherical shaped silica particles are desired. A very convenient method of manufacturing substantially spherical silica gel entails dispersing droplets of the hydrosol into a suitable suspending medium under conditions that the sol sets into firm hydrogel spheres during passage through the suspending medium. However, great difficulty has been experienced in preparing a hydrosol which will remain as such for a sufficient length of time to permit transporting it to the dropping means without gelation occurring before the droplets enter the suspending medium. On the other hand, the gelation time of the sol must not be too great because otherwise the droplets will not set into firm hydrogel particles during passage through the suspending medium. It is readily appreciated that a satisfactory hydrosol which meets these critical limitations must be prepared under very special and careful conditions.

In addition to meeting the requirements as hereinbefore set forth, the hydrosol must be of a composition that the spheres formed therefrom will be sufficiently firm so that they will not undergo splitting or disintegration upon subsequent handling. In particular, considerable difficulty has been experienced in the past because spheres which apparently appeared satisfactory underwent considerable cracking during subsequent drying treatment. This presents another critical limitation on the composition of the hydrosol and further adds to the importance of preparing the hydrosol under very selected and careful conditions.

Another serious problem encountered in the manufacture of spherical particles by the method hereinbefore set forth concerns the uniformity in the size of the spheres. In another embodiment of the present invention, specific conditions for the manufacture of pellets of uniform size are described.

Another important factor in the manufacture of satisfactory silica pellets concerns the density of the finished product. This in turn is dependent upon the particular service in which the pellets are to be used. In still another embodiment of the present invention, methods for producing silica pellets of the desired density are described.

In still another embodiment, the present invention entails the preparation of catalysts to be used for conversion of organic compounds, which catalysts include the silica formed by the improved methods of the present process.

In one embodiment the present invention relates to a method of preparing silica gel which comprises forming a silica sol comprising an alkali metal silicate, hexamethylene tetramine in a weight ratio to silica in said silicate of from about 0.02:1 to about 0.25:1, water in a weight ratio to said silica of from about 5:1 to about 20:1, and acid in an amount to reduce the pH of the sol to from about 4 to about 5, and thereafter converting said hydrosol into a gel.

As hereinbefore set forth, the preparation of a silica sol for converting into a satisfactory gel must be effected under selected and careful conditions. These selected conditions include a specific concentration of hexamethylene tetramine as compared to the silica, measured as $SiO_2$, in the alkali metal silicate, a specific concentration of water as compared to said silica, and acid in a concentration regulated to produce a sol having a pH within specific limitations. These specific concentrations are critical because the use of reactants outside of these ranges will result in gel particles which are unsatisfactory for various reasons.

Any suitable alkali metal silicate may be used in accordance with the present invention. A preferred silicate comprises sodium silicate and more particularly commercially available water glass containing 9% by weight of $Na_2O$ and 28.5% by weight of $SiO_2$. Other sodium silicates which are generally available include water glasses having a $Na_2O:SiO_2$ weight ratio of from about 1:1 to about 1:5. Other alkali metal silicates including potassium silicate, lithium silicate, etc. may be used but not necessarily with equivalent results.

In order to apply the critical concentrations of the present invention to any suitable alkali metal silicate, the ratio of the reactants is expressed in terms of the silica contained in the silicate. The silica is generally measured as $SiO_2$ and is so considered in the present specification and claims. In this manner, once the silica concentration of the alkali metal silicate is determined, the critical amounts of other reactants as hereinbefore set forth are readily determinable.

In preparing a satisfactory silica sol in accordance with the present invention, hexamethylene tetramine is utilized. The hexamethylene tetramine must be employed in a critical ratio to silica of from about 0.02:1 to about 0.25:1. Furthermore, the composition of the silica sol includes an acid in a critical concentration. Any suitable acid may be employed including sulfuric acid, hydrochloric acid, nitric acid, etc. As hereinbefore set forth, the amount of acid employed is such that the silica sol has a pH of from about 4 to about 5. Still further, the amount of water present in the hydrosol must be in a weight ratio to silica of from about 5:1 to about 20:1. The water is expressed as total water present in the sol because it may be introduced thereto in any suitable manner. Thus all or a portion of the water may be introduced as a constituent of the water glass solution, as a constituent of the hexamethylene tetramine solution, as a constituent of the acid solution, and/or as free water.

For convenience in handling, it generally is preferred that the alkali metal silicate be formed as a dilute solution so that it may be readily pumped. Similarly, for ease in handling, it is preferred that the hexamethylene tetramine be prepared as an aqueous solution, conveniently containing from about 20% to about 40% by weight of hexamethylene tetramine. Regardless of which solutions are used, the total amount of water present in the sol should be within the range as hereinbefore set forth.

All of the specific proportions hereinbefore set forth are critical. An extensive investigation of these factors has shown that the use of concentrations outside of these ranges results in silica spheres which are unsatisfactory for various reasons. For example, if the pH of the sol is too low or too little hexamethylene tetramine is used, the hydrogel pellets formed from the sol are too soft and tend to shatter when they are finally dried. On the other hand, if the pH of the sol is too high or if too much hexamethylene tetramine is used, the stability of the sol is decreased and the sol will set to a hydrogel prematurely.

As hereinbefore set forth the pH of the sol should be within the range of from about 4 to about 5. As hereinbefore set forth, a pH above this range will result in premature gelation. Therefore, at any time when all of the components are present, the pH of the mixture should not exceed about 5. In order to insure this, a preferred method of mixing the components is either to mix the hexamethylene tetramine with the alkali metal silicate and introduce this mixture into the acid or to add the alkali metal silicate to the acid and then add the hexamethylene tetramine. In both cases the acid should be constantly and vigorously stirred in order that the pH of the mixture of all components will not rise above about 5 at any time. In general it is preferred to gradually add the alkali metal silicate and hexamethylene tetramine to the acid. Water within the ranges hereinbefore set forth will be included in the final mixture. In some cases it is preferred that all or at least a portion of the ingredients and/or the mixing apparatus be cooled to below room temperature and preferably to a temperature of from about 35° to about 50° F. during the mixing operation.

A silica sol prepared in the manner hereinbefore set forth may be kept for a comparatively long period of time without gelation occurring. This time is further extended when the sol is kept at a lower temperature as, for example, a temperature of 50° F. or lower. A sol prepared in this manner has been stored for a period of over one hour at a temperature of 50° F. without gelation occurring. It is readily seen that such a sol may be satisfactorily pumped or otherwise transported to and through suitable dispersing means without gelation occurring until the sol is dispersed within the suspending medium.

In the manufacture of spherical particles, a sol prepared in the manner hereinbefore set forth, may be dispersed within a suitable suspending medium wherein the sol sets into firm hydrogel spheres. In a preferred method, droplets of the sol are passed into a liquid suspending medium. Any suitable suspending medium may be employed, including organic liquids and particularly hydrocarbon oil such as kerosene, Nujol oil, etc., and similar materials which allow the droplets to settle at a rate such that the sol sets into hydrogel during passage through the body of suspending medium. In another embodiment, the suspending medium may comprise air or other inert gas of sufficient depth to allow the necessary time for the sol to set into firm hydrogel particles. In still another embodiment, a suspending medium having a density greater than that of the sol may be employed, in which case droplets of the sol are introduced at the bottom of a confined body of the suspending medium so that the droplets rise slowly to the surface of the body and set into hydrogel during passage through the suspending medium.

As hereinbefore set forth, one of the difficulties encountered in the past in the preparation of substantially spherical particles concerns the uniformity in the size and shape of the gel particles. As applied to the preferred embodiment wherein droplets of the sol are passed through suitable orifices or from a rotating disk into a body of suspending medium, it has been found that uniformity in the gel particles may be obtained by controlling the distance that the sol drops into the suspending medium. When utilizing one or more small hollow tubes from which the droplets flow into the suspending medium, it has been found that pellets of very uniform size may be obtained by allowing the sol to flow from the tip of such tubes at a rate that separate droplets of the sol form not more than about one inch above the surface of the suspending medium. When the dropping distance is greater than about one inch, there is a tendency for the droplets to shatter and form additional very small droplets as they hit the surface of the suspending medium. The size of the droplets and accordingly the size of the hydrogel spheres may be controlled by the diameter of the tip from which the droplets flow.

In order to reduce the amount of suspending medium required in the gelation of the silica sol, it generally is preferred that the suspending medium be maintained at an elevated temperature. It has been found that the use of a hot oil bath increases the rate of gelation and, for practical reasons, it is generally desirable to employ the suspending medium at an elevated temperature. The elevated temperature, however, must be below that at which the constituents of the sol will evaporate. A particularly preferred temperature range is from about 150° to about 220° F. The time of gelation will depend upon the specific temperature and the depth of the suspending medium employed, but in any event should be sufficient so that the hydrosol droplets will set into firm hydrogel spheres during passage through the suspending medium.

After the silica sol has set into firm hydrogel spheres, the spheres may be removed from the forming zone in any suitable manner. In a particularly convenient method, a flowing stream of water may be passed beneath the body of the suspending medium, and the spheres removed from the forming zone by means of the flowing stream of water. The spheres then may be treated in any suitable manner.

As hereinbefore set forth, the density of the spheres may be varied in order to meet specific requirements. When silica spheres of high density are desired; that is, densities above about 0.8 gram per cc. apparent bulk density, the spheres are washed to remove soluble components and then are dried at a tempearture of from about 150° to about 600° F. for a period of from about 1 to 24 hours or more, and then calcined at a temperature of from about 700° to about 1600° F. for a period of from about 1 to 12 hours or more. These high density spheres have very small pore diameters and, therefor, are of particular advantage for use as a drying agent for gases because a large amount of surface area for adsorption of moisture or other components of the gases is contained in a small volume.

When low density spheres are desired; that is, spheres having a density below about 0.8 gram per cc. apparent bulk density, the spheres are preferably aged in water at an elevated temperature prior to further handling. For example, aging of the spheres at a temperature of 203° F. for 2 hours or more will yield spheres having a density of about 0.4 gram per cc. The low density spheres, on the other hand, have very large pore diameters and, therefore, are particularly suitable for use in the manufacture of catalysts for various reasons. In the first place, the low density spheres will occupy the same volume as the higher density pills but at a lower weight, and this in turn means that the thickness of the reaction chamber and the amount of supporting structure accordingly may be reduced, with the concomitant reduction in cost. Furthermore, it has been found that the low density catalysts yield substantially the same results in the conversion process as are obtained with the high density catalyst. This in turn means that the amount of the other component or components of the catalyst are reduced when using a low density catalyst, thus effecting a saving in the cost of the other component or components. This is particularly important when the other component comprises an expensive metal as, for example, a noble metal. A still further advantage to the use of the low density spheres is that the catalyst having larger pore diameter is more susceptible to regeneration than the catalyst having small pore diameters.

It is seen that silica particles of different densities are obtainable by varying the aging treatment. The temperature and time of aging vary inversely with the density of the spheres; that is, low density spheres being obtained at higher temperatures and/or longer times, while high density spheres are obtained at lower temperatures and/or shorter times. The time and temperature ranges generally will be temperatures from about 100° to about 220° F. and times from about 15 minutes to 16 hours or more. Specifically, lower density spheres are obtained by aging at temperatures about 150° F. for a time of at least one-half hour.

As hereinbefore set forth, the silica spheres may be used for adsorbents, purifying agents, desiccating agents, etc., and as components of catalysts to be used in the conversion of organic compounds. The silica spheres are particularly suitable for the manufacture of catalysts comprising silica and one or more oxides of aluminum, magnesium, zirconium, titanium, thorium, vanadium, etc., which catalysts find applicability in effecting cracking reactions. Particularly suitable cracking catalysts comprise silica-alumina, silica-magnesia, silica-alumina-magnesia, silica-zirconia, silica-alumina-zirconia, etc. In another embodiment, the silica may be composited with components having hydrogenating or dehydrogenating activity, such as the oxides in the left hand columns of groups 5 and 6 of the periodic table or the noble metals. Thus the silica spheres may be composited with one or more oxides of chromium, molybdenum, tungsten, etc. and/or oxides of platinum, palladium, nickel, cobalt, iron, etc. It is understood that the other component or components of the catalyst may comprise the metal or any suitable compound thereof including the oxide, sulfide, etc. It is understood that these are merely representative uses of the silica spheres of the present invention and that any other suitable use thereof may be employed within the scope of the present invention.

In the preparation of silica-alumina cracking catalysts, the alumina may be composited with the silica spheres in any suitable manner. In one embodiment all or a portion of the desired alumina may be incorporated in the spheres by including a suitable compound of aluminum, such as aluminum sulfate, aluminum nitrate, sodium aluminate, etc., in the sol before the latter is formed into gel. In another embodiment, the silica spheres are impregnated with a suitable salt of alumina such as aluminum sulfate, aluminum chloride, aluminum nitrate, etc., and the corresponding oxide is precipitated by means of a suitable basic compound including ammonia, ammonium hydroxide, ammonium carbonate, sodium carbonate, etc. It is understood that this general procedure of preparing silica-alumina catalysts is also applicable to the preparation of the other catalysts as hereinbefore set forth.

A particularly preferred procedure for manufacturing silica-alumina cracking catalyst comprises immersing the silica spheres in a solution of an aluminum salt and particularly aluminum sulfate, after which the spheres are withdrawn from the solution and then are immersed in a dilute solution of ammonium hydroxide. It has been found that improved stability is effected when the silica-alumina spheres are further aged in dilute acid, such as acetic acid, hydrochloric acid, nitric acid, etc. It is particularly preferred that the silica-alumina spheres be aged in acetic acid of from about 2% to about 10% concentration for a period of from about 1 to about 10 hours or more.

After impregnation and preferably after aging in dilute acid, the spheres may be washed and then dried at a temperature of from about 150° to about 600° F. for a period of from about 1 to 24 hours or more. Preferably the drying is started at low temperature and the temperature gradually increasing over a period of 1 to 2 hours or more in order to avoid sudden shock. After the pills are dried, they may be calcined at a temperature of from about 700° to 1600° F. or more for a period of from about 1 to 12 hours or more.

The following examples are introduced to illustrate further the novelty and utility of the present invention but not with the intention of unduly limiting the same.

Example I

A silica hydrosol was prepared as follows: Commercial "N" brand sodium silicate (9.0% $Na_2O$ and 28.5% $SiO_2$) was diluted with water to form a solution containing about 12% $SiO_2$. 44 ml. of 4.8 normal sulfuric acid (20.5% $H_2SO_4$) was introduced into a mixing tank which was cooled to maintain a temperature of about 50° F. The sulfuric acid was vigorously stirred and the sodium silicate solution was gradually added thereto until a pH of 2.3-2.4 was reached. This required about 150 ml. of the sodium silicate solution. 7.5 ml. of a 30% aqueous solution of hexamethylene tetramine was then added to the mixture of acid and silicate, with constant stirring. The pH of the resulting mixture was about 4.7. The sol as prepared in this manner was kept at 50° F. for about one hour without gelation occurring.

The solution as formed above was then introduced into a mixing device and dropped from an orifice tip into a body of mineral oil maintained at a temperature of about 207° F. The distance from the bottom of the droplet to the top of the oil bath was about ⅝". The droplets set into firm hydrogel spheres during passage through the oil bath and were collected in a layer of cold water disposed beneath the oil.

The hydrogel spheres were removed from the forming zone, separated from the water and then aged in hot water maintained at a temperature of about 207° F. The spheres were then removed from the water and dried in an oven at 203° F. for one hour. These pellets were of substantially uniform size and shape and of high crushing strength. The spheres, therefore, could be handled as desired without fear of excess cracking of the pellets as has been encountered in the prior methods of manufacture.

It will be noted that the concentrations of the components used in the preparation of the hydrosol are within the critical ranges hereinbefore set forth. In this particular instance, the weight ratio of hexamethylene tetramine to silica is 0.055:1, the total water in the hydrosol is in a weight ratio of 9.4:1, and the acid was used in a concentration to form a sol having a pH of 4.7.

Example II

The pellets formed in Example I were used for the manufacture of a silica-alumina cracking catalyst. The pellets were immersed for one hour in an aluminum sulfate solution having a specific gravity of 1.14, and subsequently were immersed for one hour in an ammonium hydroxide solution of 2.8% concentration. The pellets were then water washed and aged in acetic acid of 5% concentration for 3 hours. The catalyst was then water washed, dried at 176° F. for one hour and at 392° F. for 4 hours, after which they were calcined at 1200° F. for 2 hours.

The silica-alumina catalyst prepared in the above manner had an apparent bulk density of 0.47 gram per cc., a surface area of 548 square meters per gram as determined by the nitrogen adsorption method, an average pore diameter of 64 Angstroms, and a crushing strength in excess of 27 pounds per square inch. It is thus seen that the cracking catalyst prepared by the novel methods of the present invention resulted in a catalyst of improved properties.

When utilized for the cracking of Mid-Continent gas oil at a temperature of 932° F., atmospheric pressure and an hourly weight space velocity of 4 (weight of oil per hour per weight of catalyst in the reaction zone), the low density catalyst of the present invention produced gasoline in substantially the same quantity and quality as that produced by a similar catalyst having an apparent bulk density of about 0.8. As hereinbefore set forth, the low density catalyst offers numerous advantages over the high density catalyst and thereby constitutes a definite improvement in the cracking art.

Example III

As hereinbefore set forth, the reactants used in preparing the silica hydrosol must be utilized in critical proportions. This example describes a preparation in which the reactants were used in concentrations outside of the ranges hereinbefore set forth, and the resultant gel particles were unsatisfactory.

The hexamethylene tetramine must be used in a weight ratio to silica of from about 0.02:1 to about 0.25:1, and the acid in a concentration to produce a sol having a pH of from about 4 to about 5. In this preparation, the amount of hexamethylene tetramine was in a weight ratio to silica of 0.008:1 (which is below the lower limit of 0.02:1 of the present invention).

When this sol was used in the preparation of hydrogel particles by dropping into a body of mineral oil maintained at a temperature of about 207° F., the resultant hydrogel particles were too soft, and the particles shattered upon being dried at a temperature of 200° F.

Example IV

This example illustrates the other extreme compared to Example III. The hexamethylene tetramine was used in a weight ratio to silica of 0.3:1 (which is above the upper limit of 0.25:1). The resultant sol set to a hydrogel within 10-15 seconds and, therefore, could not be satisfactorily transported to and through the mixing device and dropping tube. The sol set into a hydrogen in the mixing device and would not flow through the dropping tube into the oil bath.

Example V

This example illustrates the effect of total water in the silica sol in an excess of the upper range specified in the present application. A silica sol may be prepared to contain water in a weight ratio to silica of 25:1. After passing droplets of the sol into a hot oil bath, the resultant particles will be soft and will break on further handling.

Example VI

This example illustrates the effect of using water in the silica sol below the lower range specified in the present application. A sol prepared to contain water in a weight ratio to silica of 4:1 will precipitate during addition to the acid and, therefore, this mixture cannot be used for the preparation of silica spheres.

Example VII

A sol as prepared in accordance with Example I may be used for the preparation of a silica magnesia catalyst. This catalyst may be prepared by the same procedure set forth in Example II but in place of using aluminum sulfate, magnesium chloride may be employed. The resultant silica-magnesia catalyst may be used for the cracking of gas oil into gasoline at substantially the same operating conditions as set forth in Example II.

*Example VIII*

A satisfactory silica hydrosol may be prepared in substantially the same manner described in Example I except that the 30% hexamethylene tetramine solution may be diluted further to an aqueous solution containing 15% by weight of hexamethylene tetramine. However, as hereinbefore set forth, the additional water incorporated into the sol in this manner must be deducted from the water introduced with the other reactants.

I claim as my invention:

1. A method of preparing silica gel which comprises forming a silica sol comprising an alkali metal silicate, hexamethylene tetramine in a weight ratio to silica in said silicate of from about 0.02:1 to about 0.25:1, water in a weight ratio to said silica of from about 5:1 to about 20:1, and acid in an amount to reduce the pH of the sol to from about 4 to about 5, and thereafter converting said hydrosol into a gel.

2. A method of preparing silica gel which comprises forming a silica sol comprising sodium silicate, hexamethylene tetramine in a weight ratio to silica in said silicate of from about 0.02:1 to about 0.25:1, water in a weight ratio to said silica of from about 5:1 to about 20:1, and sulfuric acid in an amount to reduce the pH of the sol to from about 4 to about 5, and thereafter converting said hydrosol into a gel.

3. A method which comprises forming a silica sol comprising an alkali metal silicate, hexamethylene tetramine in a weight ratio to silica in said silicate of from about 0.02:1 to about 0.25:1, water in a weight ratio to said silica of from about 5:1 to about 20:1, and acid in an amount to reduce the pH of the sol to from about 4 to about 5, and thereafter passing said silica sol in finely divided condition into a suspending medium wherein the sol sets into firm hydrogel spheres.

4. A method which comprises forming a silica sol comprising sodium silicate, hexamethylene tetramine in a weight ratio to silica in said silicate of from about 0.02:1 to about 0.25:1, water in a weight ratio to said silica of from about 5:1 to about 20:1, and sulfuric acid in an amount to reduce the pH of the sol to from about 4 to about 5, and thereafter passing droplets of said silica sol into a water immiscible suspending medium wherein the sol sets into firm hydrogen spheres.

5. A method which comprises forming a silica sol comprising an alkali metal silicate, hexamethylene tetramine in a weight ratio to silica in said silicate of from about 0.02:1 to about 0.25:1, water in a weight ratio to said silica of from about 5:1 to about 20:1, and acid in an amount to reduce the pH of the sol to from about 4 to amout 5, and thereafter passing droplets of said silica sol into a water immiscible suspending liquid maintained at an elevated temperature wherein the sol sets into firm hydrogel spheres.

6. The process of claim 5 further characterized in that the distance in which said droplets pass before reaching the liquid suspending medium is not greater than about 1".

7. A method which comprises forming a silica sol comprising sodium silicate, hexamethylene tetramine in a weight ratio to silica in said silicate of from about 0.02:1 to about 0.25:1, water in a weight ratio to said silica of from about 5:1 to about 20:1, and sulfuric acid in an amount to reduce the pH of the sol to from about 4 to about 5, and thereafter passing droplets of said silica sol into a hot oil bath maintained at a temperature of from about 150° to about 220° F., wherein the sol sets into firm hydrogen spheres.

8. A method which comprises forming a silica sol comprising an alkali metal silicate, hexamethylene tetramine in a weight ratio to silica in said silicate of from about 0.02:1 to about 0.25:1, water in a weight ratio to said silica of from about 5:1 to about 20:1, and acid in an amount to reduce the pH of the sol to from about 4 to about 5, thereafter passing droplets of said silica sol into a water immiscible suspending liquid maintained at an elevated temperature wherein the sol sets into firm hydrogel spheres, and thereafter aging the resultant spheres in water maintained at a temperature of from about 100° to about 220° F. for a time period in excess of 15 minutes.

9. A method which comprises forming a silica sol comprising sodium silicate, hexamethylene tetramine in a weight ratio to silica in said silicate of from about 0.02:1 to about 0.25:1, water in a weight ratio to said silica of from about 5:1 to about 20:1, and sulfuric acid in an amount to reduce the pH of the sol to from about 4 to about 5, thereafter passing droplets of said silica sol into a hot oil bath maintained at a temperature of from about 150° to about 220° F., and thereafter aging the resultant hydrogel spheres in water maintained at a temperature of from about 150° to about 220° F. for a time in excess of 15 minutes.

10. A method of preparing a catalyst containing silica which comprises forming a silica sol comprising an alkali metal silicate, hexamethylene tetramine in a weight ratio to silica in said silicate of from about 0.02:1 to about 0.25:1, water in a weight ratio to said silica of from about 5:1 to about 20:1 and acid in an amount to reduce the pH of the sol to from about 4 to about 5, thereafter converting said silica sol into a gel, compositing with the resultant gel a catalytically active component, and thereafter drying and calcining said composite.

11. A method of preparing a catalyst containing silica which comprises forming a silica sol comprising sodium silicate, hexamethylene tetramine in a weight ratio to silica in said silicate of from about 0.02:1 to about 0.25:1, water in a weight ratio to said silica of from about 5:1 to about 20:1 and sulfuric acid in an amount to reduce the pH of the sol to from about 4 to about 5, thereafter converting said silica sol into a gel, compositing with the resultant gel a catalytically active component, and thereafter drying and calcining said composite.

12. A method of preparing a catalyst containing silica which comprises forming a silica sol comprising an alkali metal silicate, hexamethylene tetramine in a weight ratio to silica in said silicate of from about 0.02:1 to about 0.25:1, water in a weight ratio to said silica of from about 5:1 to about 20:1 and acid in an amount to reduce the pH of the sol to from about 4 to about 5, thereafter converting said silica sol into a gel, compositing with the resultant gel a catalytically active component, aging the resultant composite in a dilute acid solution for a time of at least one hour, and thereafter drying and calcining the composite.

13. A method of preparing a catalyst containing silica which comprises forming a silica sol comprising sodium silicate, hexamethylene tetramine in a weight ratio to silica in said silicate of from about 0.02:1 to about 0.25:1, water in a weight ratio to said silica of from about 5:1 to about 20:1 and sulfuric acid in an amount to reduce the pH of the sol to from about 4 to about 5, thereafter converting said silica sol into a gel, compositing with the resultant gel a catalytically active component, aging the resultant composite in dilute acetic acid solution for a time of at least one hour, and thereafter drying and calcining the composite.

14. A method of preparing a substantially spherical catalyst comprising silica and at least one oxide of a metal selected from the group consisting of aluminum, magnesium, zirconium, titanium, thorium and vanadium which comprises forming a silica sol comprising sodium silicate, hexamethylene tetramine in a weight ratio to silica in said silicate of from about 0.02:1 to about 0.25:1, water in a weight ratio to said silica of from about 5:1 to about 20:1 and sulfuric acid in an amount to reduce the pH of the sol to from about 4 to about 5, thereafter converting said silica sol into a gel by passing droplets of the sol into an oil bath maintained at a temperature of from about 150° to about 220° F., compositing with the resultant gel a catalytically active component of the group hereinbefore set forth, aging the resultant composite in a dilute acid solution for a time of at least one hour, and thereafter drying and calcining the composite.

15. The process of claim 14 further characterized in that the distance in which said droplets pass before reaching the oil bath is not greater than about 1″.

JAMES HOEKSTRA.

References Cited in the file of this patent

UNITED STATES PATENTS

| Number | Name | Date |
|---|---|---|
| 1,782,857 | Miller et al. | Nov. 25, 1930 |
| 2,406,420 | Weiser et al. | Aug. 27, 1946 |